(12) United States Patent
Nakanishi et al.

(10) Patent No.: US 6,248,803 B1
(45) Date of Patent: Jun. 19, 2001

(54) RADIATION-CURABLE RESIN COMPOSITIONS

(75) Inventors: Tetsuo Nakanishi; Michihiro Sugo, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/342,147

(22) Filed: Jun. 29, 1999

(30) Foreign Application Priority Data

Jun. 29, 1998 (JP) .................................................. 10-197983

(51) Int. Cl.$^7$ ................................ C08F 2/48; C08F 30/06; C08F 130/08
(52) U.S. Cl. ............................ 522/172; 522/99; 522/148; 522/120; 522/121; 526/279; 528/10; 528/12; 528/32; 528/33; 528/37
(58) Field of Search .............................. 522/99, 148, 172, 522/120, 121; 528/10, 12, 37, 33, 32; 526/279

(56) References Cited

U.S. PATENT DOCUMENTS

| | | | |
|---|---|---|---|
| 4,153,641 | * | 5/1979 | Deichert et al. ...................... 528/26 |
| 4,189,546 | * | 2/1980 | Deichert et al. ...................... 528/26 |
| 4,217,038 | * | 8/1980 | Letter et al. ...................... 351/160 R |
| 4,254,248 | * | 3/1981 | Friends et al. ...................... 526/279 |
| 4,259,467 | * | 3/1981 | Keogh et al. ...................... 526/279 |
| 4,276,402 | * | 6/1981 | Chromecek et al. ...................... 526/264 |
| 4,277,595 | * | 7/1981 | Deichert et al. ...................... 528/26 |
| 5,436,281 | * | 7/1995 | Irifune et al. ...................... 522/99 |
| 5,982,041 | * | 11/1999 | Mitani et al. ...................... 257/783 |

FOREIGN PATENT DOCUMENTS

| | | |
|---|---|---|
| 53-36515 | 10/1978 | (JP) . |
| 56-86922 | 7/1981 | (JP) . |
| 61-232 | 1/1986 | (JP) . |
| 5309664 | 11/1993 | (JP) . |

OTHER PUBLICATIONS

Derwent–ACC–NO–1994–330171. Abstract for JP 06256519A.*

* cited by examiner

*Primary Examiner*—James J. Seidleck
*Assistant Examiner*—Sanza McClendon

(57) ABSTRACT

A radiation-curable resin composition comprising (A) an organopolysiloxane having at least one acrylic functional group and (B) a photopolymerization initiator cures, upon exposure to radiation, into a flexible product having a gel fraction of at least 85% by weight.

6 Claims, No Drawings

RADIATION-CURABLE RESIN COMPOSITIONS

This invention relates to radiation-curable resin compositions based on acryl group-bearing organopolysiloxanes, and more particularly, to radiation-curable resin compositions based on acryl group-bearing organopolysiloxanes having a minimized content of non-functional organopolysiloxane and finding use in the coating application as mold release coating agents, protective coating agents, water-repellent coating agents, printing ink, and paint.

BACKGROUND OF THE INVENTION

As silicone compositions curable with ultraviolet radiation and electron beams, organopolysiloxanes containing (meth)acryloxy groups in the molecule are known, and compositions comprising the same in admixture with sensitizers are also known from JP-B 53-36515. However, since the organopolysiloxanes in these compositions have a high content of (meth)acryloxy groups, the cured coatings are so hard that they do not smoothly follow the underlying substrates and are liable to cracking.

JP-A 61-232 and 56-86922 disclose a method for preparing an acrylic functional, UV-curable polysiloxane by adding an acrylic acid to an epoxy group-bearing organopolysiloxane. Since some acrylic acid is left unreacted, the cured coating has poor moisture resistance and electrical properties due to the influence of carboxyl groups left therein. If the amount of acrylic acid blended is reduced, some epoxy groups are left instead. As a result, the surface layer of cured coating is exacerbated in weather resistance and acid resistance by epoxy groups.

As a method of preventing acrylic acid from being left in radiation-curable coating compositions, JP-A 5-309664 discloses to introduce (meth)acryl groups into an organopolysiloxane by effecting dealcoholysis between alkoxysilyl groups and a (meth)acryl group-bearing silanol compound in the presence of a tin catalyst. The (meth)acryl group-bearing silanol compound, however, is difficult to synthesize and expensive from the commercial aspect. The residual tin catalyst is undesirable from the safety aspect.

Other methods known for the preparation of (meth)acryl functional organopolysiloxanes of this type include dehydrochlorination reaction between $\equiv$Si—Cl groups and a hydroxyl group-bearing acrylate compound, dehydrochlorination reaction between a carbinol group-bearing siloxane and acrylic chloride, and hydrosilylation reaction between $\equiv$Si—H groups and allyl (meth)acrylate. These methods suffer from problems such as difficult removal of by-products or hydrochloride salts, and complex reactions including dehydrogenation condensation by side reaction during hydrosilylation and multi-stage reaction. These methods are not regarded as commercially simple and inexpensive.

For improving the compatibility with other acrylic compounds and the transparency of resins, it is known to introduce phenyl groups into silicone compounds. This is conventionally carried out by equilibration using octaphenylcyclotetrasiloxane, with the drawback that much cyclic diphenylsiloxane is left in the synthesized polysiloxane.

SUMMARY OF THE INVENTION

An object of the invention is to provide a radiation-curable resin composition which is based on a radiation-curable acryl group-bearing organopolysiloxane compatible with other (meth)acrylic compounds and which cures into a highly flexible product.

The inventor has found that an organopolysiloxane having acrylic functional groups represented by the following average compositional formula (1):

wherein A is —(CH$_2$)$_m$—OCOCR$^1$=CH$_2$ wherein R$^1$ is hydrogen or a monovalent hydrocarbon group having 1 to 6 carbon atoms, and m is an integer of 1 to 5, R$^2$ is independently hydrogen or a monovalent hydrocarbon group having 1 to 10 carbon atoms, x is a number from 0.002 to 1.50, y is a number from 0 to 3.0, and the sum of x and y is from 1.5 to 2.5, which can be obtained by equilibration reaction between a first organopolysiloxane of the following average compositional formula (3):

wherein A and R$^2$ are as defined above, a is an integer from 1 to 3, b is an integer from 0 to 2, and the sum of a and b is from 1 to 3, and a second organopolysiloxane of the following average compositional formula (4):

wherein R$^3$ is hydrogen or a monovalent saturated hydrocarbon group having 1 to 6 carbon atoms, R$^4$ is independently a monovalent hydrocarbon group having 1 to 10 carbon atoms, c is an integer from 0 to 3, d is an integer from 0 to 3, and the sum of c and d is from 1 to 3, has a reduced content of siloxane components non-bondable with acryl functional groups and is fully compatible with other acrylic compounds. This is especially true with an organopolysiloxane having an acryl group at either end represented by the following average compositional formula (2):

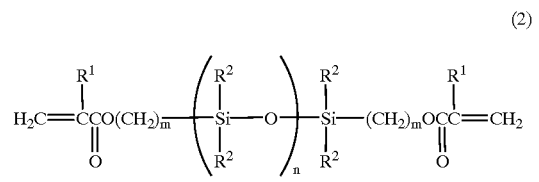

wherein R$^1$, R$^2$ and m are as defined above, and n is an integer of 100 to 1,000, which can be obtained by equilibration reaction between an organopolysiloxane dimer having an acryl group at either end represented by the following average compositional formula (5):

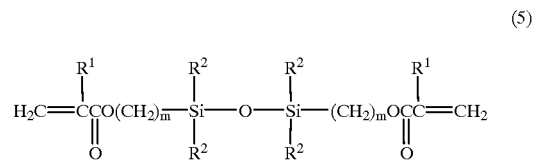

wherein R$^1$, R$^2$, and m are as defined above, and at least one of cyclic organopolysiloxanes of the following average compositional formulae (6) and (7):

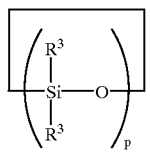

(6)

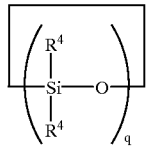

(7)

wherein $R^3$ and $R^4$ are as defined above, each of p and q is an integer from 3 to 8. A resin composition having blended therein the acryl group-bearing organopolysiloxane compound defined above is successful in improving a gel fraction, which has never been achieved with conventional silicone-bearing acrylic resins, while maintaining physical properties inherent to silicone including a low Young's modulus, high elongation and high rupture strength.

DETAILED DESCRIPTION OF THE INVENTION

In one aspect, the invention provides a radiation-curable resin composition comprising (A) an organopolysiloxane having at least one acrylic functional group, preferably an acryl functional group at either end, and (B) a photopolymerization initiator. Upon exposure to radiation, the composition cures into a product having a gel fraction of at least 85% by weight, preferably 85 to 97% by weight, more preferably 90 to 97% by weight.

The term "gel fraction" used herein is determined by extracting a cured resin with 2-butanone for 12 hours by Soxhlet extraction method, vacuum drying the residual resin at 100° C. for 2 hours, measuring the weight of the dry resin, and dividing it by the weight of the initial resin. A cured resin having a low gel fraction is undesirably reduced in strength. A gel fraction of at least 85% by weight ensures that a resin undergoes minimized changes of elongation and strength with the lapse of time.

The organopolysiloxane (A) providing a gel fraction in the above range is preferably an organopolysiloxane having acryl functional groups represented by the following average compositional formula (1), more preferably an organopolysiloxane having an acryl group at either end represented by the following average compositional formula (2).

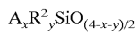 (1)

(2)

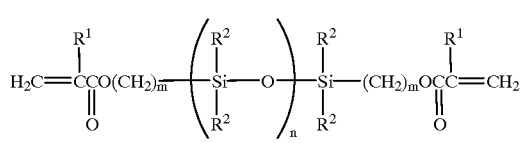

In the formulae, A is $-(CH_2)_m-OCOCR^1=CH_2$ wherein $R^1$ is hydrogen or a monovalent hydrocarbon group having 1 to 6 carbon atoms, and m is an integer of 1 to 5, $R^2$ is hydrogen or a monovalent hydrocarbon group having 1 to 10 carbon atoms, the $R^2$ groups may be identical or different, letter x is a number having a value of 0.002 to 1.50, y is a number having a value of 0 to 3.0, and the sum of x and y is from 1.5 to 2.5 (i.e., $1.5 \leq x+y \leq 2.5$), and n is an integer of 100 to 1,000.

Herein, $R^1$ is hydrogen or a monovalent hydrocarbon group, typically alkyl, having 1 to 6 carbon atoms, preferably hydrogen or methyl. Most desirably $R^1$ is a hydrogen atom from the standpoint of a reaction rate during radiation curing.

$R^2$ is hydrogen or a monovalent hydrocarbon group having 1 to 10 carbon atoms, preferably straight, branched or cyclic alkyl groups of 1 to 10 carbon atoms, especially 1 to 6 carbon atoms, aryl groups of 6 to 10 carbon atoms, and aralkyl groups of 7 to 10 carbon atoms, for example, methyl, ethyl, propyl, butyl, and phenyl, with the methyl and phenyl groups being especially preferred for the commercial purpose. For compatibility with other acrylic compounds, it is preferred that aromatic hydrocarbon groups such as phenyl, β-phenylethyl and α-methyl-β-phenylethyl groups be contained so as to give a phenyl content of 15 to 25 mol % based on the total amount of $R^2$. Owing to the phenyl introduced, the organopolysiloxane (A) has a refractive index of 1.44 to 1.51, which contributes to an improvement in compatibility with other (meth)acrylic diluents.

Preferably the organopolysiloxane (A) has a degree of polymerization (n) of about 100 to about 1,000. With a degree of polymerization of less than 100, a cured coating would be less flexible. Organopolysiloxanes with a degree of polymerization of more than 1,000 would be less compatible with other acrylic compounds. The more preferred range of degree of polymerization is from about 150 to about 500.

Since the organopolysiloxane of formula (2) in this preferred embodiment is a linear one of 100 to 1,000 siloxane chains having acryl groups at both ends, it is satisfactorily curable with radiation and effective in imparting flexibility after curing. By introducing phenyl groups using a cyclic organopolysiloxane having a phenyl group, the organopolysiloxane becomes compatible with other acrylic compounds and is improved in the transparency of coatings after radiation curing.

The organopolysiloxane (A) can be obtained by effecting equilibration reaction between a first organopolysiloxane of the following average compositional formula (3):

 (3)

wherein A is $-(CH_2)_m-OCOCR^1=CH_2$, $R^1$ is hydrogen or a monovalent hydrocarbon group having 1 to 6 carbon atoms, and m is an integer of 1 to 5, $R^2$ is independently hydrogen or a monovalent hydrocarbon group having 1 to 10 carbon atoms, a is an integer of $0<a \leq 3$, b is an integer of $0 \leq b<3$, and $1 \leq a+b \leq 3$, and a second organopolysiloxane of the following average compositional formula (4):

 (4)

wherein $R^3$ is hydrogen or a monovalent saturated hydrocarbon group having 1 to 6 carbon atoms, $R^4$ is independently a monovalent hydrocarbon group having 1 to 10 carbon atoms, c is an integer of $0 \leq c \leq 3$, d is an integer of $0 \leq d \leq 3$, and $1 \leq c+d \leq 3$, preferably the second organopolysiloxane containing at least one aromatic hydrocarbon group in the molecule. Especially, the organopolysiloxane of formula (2) can be obtained by effecting equilibration reaction between an organopolysiloxane dimer having an acryl group at either end represented by the following average compositional formula (5) and at least one of cyclic organopolysiloxanes of the following average compositional formulae (6) and (7).

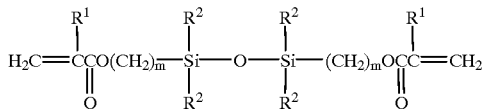
(5)

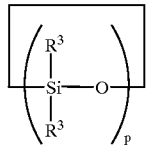
(6)

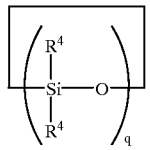
(7)

In the formulae, $R^1$ is hydrogen or a monovalent hydrocarbon group having 1 to 6 carbon atoms, $R^2$ is independently hydrogen or a monovalent hydrocarbon group having 1 to 10 carbon atoms, $R^3$ is hydrogen or a monovalent saturated hydrocarbon group having 1 to 6 carbon atoms, $R^4$ is independently a monovalent hydrocarbon group having 1 to 10 carbon atoms, preferably providing at least one aromatic hydrocarbon group in the molecule, and m is an integer of 1 to 5, each of p and q is an integer from 3 to 8.

Herein, substituents $R^1$ and $R^2$ are as defined for the organopolysiloxane (A). It is especially preferred that $R^1$ be hydrogen and $R^2$ be methyl, because this combination is effective in increasing the purity of organopolysiloxane of formula (5) or disiloxane having acryl groups at both ends, when worked up. Letter m is an integer of 1 to 5, preferably 2. It is noted that the organopolysiloxane of formula (5) is synthesized by desalting reaction between bis(chloroethyl)tetramethyldisiloxane and an alkali salt of acrylic acid. It is available at a purity of 95% or higher simply by distillation.

$R^3$ is hydrogen or a straight, branched or cyclic, monovalent saturated hydrocarbon group having 1 to 6 carbon atoms. $R^3$ is preferably a saturated hydrocarbon group selected from methyl and ethyl. On a commercial basis, methyl is often used because of ease of availability. Letter p is an integer of 3 to 8. From the reactivity standpoint, p is preferably equal to 3 or 4, most preferably 3.

When $R^4$ represents monovalent hydrocarbon groups having 1 to 10 carbon atoms, illustrative groups are straight, branched or cyclic alkyl groups of 1 to 10 carbon atoms, especially 1 to 6 carbon atoms, aryl groups of 6 to 10 carbon atoms, and aralkyl groups of 7 to 10 carbon atoms, for example, methyl, ethyl, propyl, butyl, and phenyl, with the methyl and phenyl groups being especially preferred for the commercial purpose. These groups are preferably contained so as to provide a phenyl content of 15 to 100 mol % based on the entire $R^4$ groups. Letter q is an integer of 3 to 8. From the reactivity standpoint, q is preferably equal to 3 or 4, most preferably 3.

Preferred as the cyclic organopolysiloxane of formula (6) are hexamethylcyclotrisiloxane and octamethylcyclotetrasiloxane. Preferred as the cyclic organopolysiloxane of formula (7) are 1,1-diphenyl-3,3,5,5-tetramethylcyclotrisiloxane, 1-phenyl-1,3,3,5,5-pentamethylcyclotrisiloxane, and hexaphenylcyclotrisiloxane. Especially preferred is diphenyltetramethylcyclotrisiloxane which is obtained by hydrolytic reaction between dichlorotetramethyldisiloxane and diphenylsilane diol or hydrolysis between tetramethyldisiloxane diol and diphenyldichlorosilane.

Equilibration reaction is preferably carried out in the presence of acid catalysts. Acid equilibration reaction is carried out under well-known conditions. Particularly when a phenyl group-bearing cyclic organopolysiloxane is used as the organopolysiloxane of formula (7), the reaction system is preferably heated at 50 to 70° C. before the start of reaction because the reactant is solid. However, when a solvent is used for acid equilibration reaction, heating to this temperature range is not necessary and reaction may be carried out at room temperature. At the end of equilibration reaction, the reaction mixture is neutralized in a conventional manner and volatiles are distilled off in vacuum.

The amount of the phenyl group-bearing cyclic organopolysiloxane blended is preferably such that the acryl group-bearing organopolysiloxane (A) may have a phenyl content of 5 to 50 mol %, more preferably 15 to 25 mol % based on the entire $R^2$ groups, as described above. By adjusting the phenyl content within this range, the organopolysiloxane becomes more compatible with other acrylic monomers and more transparent.

The radiation-curable resin composition based on organopolysiloxane (A) according to the invention can be reduced in viscosity by diluting it with a radiation-curable diluent. The diluted composition becomes more flowing when applied by an automatic applicator, which is advantageous in preparing the end coating. The diluents used herein include monofunctional diluents, for example, acrylic acid, 2-hydroxyethyl acrylate, 2-hydroxypropyl acrylate, 2-ethylhexyl acrylate, isobornyl acrylate, dicyclopentenyl acrylate, 2-hydroxyethyl methacrylate, dimethylacrylamide, N-vinylpyrrolidone, N-vinylcaprolactam, acryloyl morpholine, and N-vinylimidazole; and polyfunctional diluents, for example, tricyclodecane dimethanol diacrylate, pentaerythritol triacrylate, trimethylol propane triacrylate, and polyethylene(propylene)glycol diacrylate.

Prior to use, the photopolymerization initiator is added to the radiation-curable resin composition of the invention. Exemplary initiators include 2,2-diethoxy-acetophenone, benzophenone, p-methoxybenzophenone, benzoyl methyl ether, 4-chlorobenzophenone, 4,4'-dimethoxybenzophenone, acetophenone, propiophenone, xanthone, benzoyl, benzyl, naphthoquinone, 4-methylacetophenone, anthraquinone, t-butyl perbenzoate, 2,4,6-trimethylbenzoyldiphenylphosphine oxide (TPO), 2-methyl-1-[4-(methylthio)phenyl]-2-morpholinopropane-1 (Irgacure® 907), 2-benzyl-2-dimethylamino-1-(4-morpholinophenyl)butanone-1 (Irgacure® 369), hydroxycyclohexyl phenyl ketone (Irgacure® 184), 3,6-bis(2-morpholinoisobutyl)-9-butylcarbazole (A-CURE3), bis(2,6-dimethoxybenzoyl)-2,4,4-trimethylpentylphosphine oxide (BDTPO), and thioxanthone derivatives. These initiators may be used alone or in admixture. Commercially available mixtures of initiators are Irgacure 1700 and Irgacure 149 from Chiba Geigy.

Further, antioxidants such as BHT and stabilizers may be used as additives in the composition for improving the long-term stability thereof.

When the acryl group-bearing organopolysiloxane (A) is used as a flexibility-imparting agent, a composition comprising 100 parts by weight of organopolysiloxane (A) and 0.1 to 10 parts, preferably 0.5 to 5 parts by weight of the photopolymerization initiator is effectively curable. To this composition, 0 to 400 parts by weight of the diluent may be added. Preferably 100 to 300 parts by weight of the diluent is added. A resin composition diluted with less than 100 parts by weight of the diluent would have a too high viscosity and become less advantageous when it is applied by an automatic feeder or the like. If the resin composition is diluted with an excessive amount of the diluent, the effect of the organopolysiloxane (A) would undesirably decline.

For curing, various types of radiation are used. For example, electron beams, α-rays, β-rays, and γ-rays are useful as well as ultraviolet radiation emitted from mercury arc lamps, medium-pressure mercury lamps, and high-pressure mercury lamps. The dose of radiation with which the resin composition can be cured is about 2 to 5 Mrad for electron beams, for example. In the case of UV radiation, the composition may be exposed for about 0.1 to 20 seconds to radiation from a 2-kW high-pressure mercury lamp (80 W/cm) at a distance of 8 cm.

The radiation-curable resin composition is fully curable with UV radiation or electron beams and endows cured coatings with flexibility, sliding ability, water repellency or the like. It is commercially advantageous that flexibility is imparted to radiation-curing type resins which are conventionally regarded hard and brittle. Therefore, the composition can find advantageous use in the coating application as mold release coating agents, water-repellent coating agents, protective coating agents, printing ink, and paint.

EXAMPLE

Examples of the invention are given below by way of illustration and not by way of limitation. All parts are by weight.

Synthesis Example: Synthesis of Acryl Group-Bearing Organopolysiloxane (A)

Organopolysiloxane 1

A reactor was charged with 100 parts of 1,3-bis (acryloxymethyl)-tetramethyldisiloxane, 1,960 parts of octamethylcyclotetrasiloxane, and 4,582 parts of 1,1-diphenyl-3,3,5,5-tetramethylcyclotrisiloxane. At 60° C., 7 parts of trifluoromethanesulfonic acid was added and equilibration reaction effected for 24 hours. The reaction mixture was neutralized with sodium bicarbonate, treated with activated carbon, and filtered. Volatiles were distilled off at 150° C. and 5 mmHg, yielding Organopolysiloxane 1. Its physical properties are shown in Table 1.

Organopolysiloxane 2

A reactor was charged with 100 parts of 1,3-bis(ethyl acrylate)-tetramethyldisiloxane and 6,300 parts of 1-phenyl-1,3,3,5,5-pentamethylcyclotrisiloxane. At 60° C., 7 parts of trifluoromethanesulfonic acid was added and equilibration reaction effected for 24 hours. The reaction mixture was neutralized with sodium bicarbonate, treated with activated carbon, and filtered. Volatiles were distilled off at 150° C. and 5 mmHg, yielding Organopolysiloxane 2. Its physical properties are shown in Table 1.

Organopolysiloxane 3

A reactor was charged with 100 parts of 1,3-dihydrogentetramethyldisiloxane, 8,725 parts of octamethylcyclotetrasiloxane, and 5,910 parts of octaphenylcyclotetrasiloxane. At 30° C., 7 parts of trifluoromethanesulfonic acid was added and equilibration reaction effected for 24 hours. The reaction mixture was neutralized with sodium bicarbonate, treated with activated carbon, and filtered. Volatiles were distilled off at 250° C. and 5 mmHg, yielding α,ω-dihydrogenmethylphenylpolysiloxane. This α,ω-dihydrogenmethylphenylpolysiloxane and trimethylolpropane triacrylate (TMPTA) were subjected to addition reaction at 80° C. using tristriphenylphosphine rhodium(I) chloride. Volatiles were distilled off at 150° C. and 5 mmHg, yielding Organopolysiloxane 3. Its physical properties are shown in Table 1.

Organopolysiloxane 4

A reactor was charged with 100 parts of 1,3-bis(3-aminopropyl)-tetramethyldisiloxane, 3,580 parts of octamethylcyclotetrasiloxane, and 4,387 parts of methylphenylcyclopolysiloxane (cyclic compound mixture). Potassium siliconate, 1 part, was added and equilibration reaction effected. The reaction mixture was neutralized with acetic acid, yielding α,ω-diaminopropylmethylphenylpolysiloxane. This was subjected to amidation reaction with acrylic acid chloride. Volatiles were distilled off at 150° C. and 5 mmHg, yielding α,ω-di(amidopropyl acrylate)-methylphenylpolysiloxane, designated Organopolysiloxane 4. Its physical properties are shown in Table 1.

Organopolysiloxane 5

A reactor was charged with 100 parts of 1,3-bis (acryloxymethyl)-tetramethyldisiloxane, 3,872 parts of octamethylcyclotetrasiloxane, and 2,623 parts of octaphenylcyclotetrasiloxane. At 30° C., 7 parts of trifluoromethanesulfonic acid was added and equilibration reaction effected for 24 hours. The reaction mixture was neutralized with sodium bicarbonate, treated with activated carbon, and filtered. Volatiles were distilled off at 150° C. and 5 mmHg, yielding Organopolysiloxane 5. Its physical properties are shown in Table 1.

TABLE 1

| | Viscosity (cs, 25° C.) | Refractive index (25° C.) | Volatiles at 105° C./3 hr (wt %) | Degree of polymerization, n | Remarks |
|---|---|---|---|---|---|
| Organopolysiloxane 1 | 6,610 | 1.4835 | 0.4 | 200 | invention |
| Organopolysiloxane 2 | 2,930 | 1.4712 | 0.3 | 200 | invention |
| Organopolysiloxane 3 | 14,400 | 1.4854 | 1.2 | 200 | comparison |
| Organopolysiloxane 4 | 10,600 | 1.4832 | 0 | 200 | comparison |
| Organopolysiloxane 5 | 3,700 | 1.4844 | 0.5 | 200 | comparison |

Examples 1–2 & Comparative Examples 1–3

Mixtures of 100 parts of the acryl group-bearing organopolysiloxanes synthesized above and 3 parts of a photopolymerization initiator were cured with UV radiation. The initiator used was Irgacure 1700 from Chiba Geigy. The physical properties of the cured products are shown in Table 2. Young's modulus was measured at 25° C. and a testing rate of 1 mm/min while elongation and strength were measured at a testing rate of 50 mm/min.

TABLE 2

|  | E1 | E2 | CE1 | CE2 | CE3 |
|---|---|---|---|---|---|
| Organopolysiloxane 1 | 100 | | | | |
| Organopolysiloxane 2 | | 100 | | | |
| Organopolysiloxane 3 | | | 100 | | |
| Organopolysiloxane 4 | | | | 100 | |
| Organopolysiloxane 5 | | | | | 100 |
| Initiator | 3 | 3 | 3 | 3 | 3 |
| Young's modulus (kgf/mm$^2$) | 0.036 | 0.04 | 0.027 | 0.025 | 0.03 |
| Elongation (%) | 220 | 230 | 136 | 138 | 125 |
| Gel fraction (%) | 86.8 | 89.0 | 81.7 | 81.3 | 78.2 |
| Transparency | OK | OK | OK | OK | OK |

It is evident that radiation-curable acrylic resin compositions based on an organopolysiloxane having acryl groups at both ends provide cured products having improved flexibility.

Japanese Patent Application No. 10-197983 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A radiation-curable resin composition comprising (A) an organopolysiloxane having acrylic functionality and (B) a photopolymerization initiator, said composition curing upon exposure to radiation into a product having a gel fraction of at least 85% by weight, said organopolysiloxane (A) being obtained by effecting equilibration reaction of an organopolysiloxane dimer represented by the following average compositional formula:

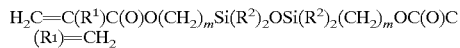

$H_2C=C(R^1)C(O)O(CH_2)_mSi(R^2)_2OSi(R^2)_2(CH_2)_mOC(O)C(R^1)=CH_2$ wherein $R^1$ is hydrogen or a monovalent hydrocarbon group having 1 to 6 carbon atoms, $R^2$ is independently hydrogen or a monovalent hydrocarbon group having 1 to 10 carbon atoms, and m is an integer of 1 to 5 with hexamethylcyclotrisiloxane or octamethylcyclotetrasiloxane or a mixture thereof and at least one cyclic organopolysiloxane selected from the group consisting of 1,1-diphenyl-3,3,5,5-tetramethylcyclotrisiloxane, 1-phenyl-1,3,3,5,5-pentamethylcyclotrisiloxane, and hexaphenylcyclotrisiloxane.

2. A process for preparing a radiation-curable resin composition comprising (A) an organopolysiloxane having at least one acrylic functional group and (B) a photopolymerization initiator, said composition curing upon exposure to radiation into a product having a gel fraction of at least 85% by weight, said process comprising the steps of effecting equilibration reaction of an organopolysiloxane dimer represented by the following average compositional formula:

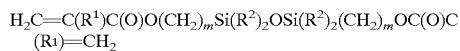

$H_2C=C(R^1)C(O)O(CH_2)_mSi(R^2)_2OSi(R^2)_2(CH_2)_mOC(O)C(R^1)=CH_2$ wherein $R^1$ is hydrogen or a monovalent hydrocarbon group having 1 to 6 carbon atoms, $R^2$ is independently hydrogen or a monovalent hydrocarbon group having 1 to 10 carbon atoms, and m is an integer of 1 to 5 with hexamethylcyclotrisiloxane or octamethylcyclotetrasiloxane or a mixture thereof and at least one cyclic organopolysiloxane selected from the group consisting of 11,-diphenyl-3,3,5,5-tetramethylcyclotrisiloxane, 1-phenyl-1,3,3,5,5-pentamethylcyclotrisiloxane, and hexaphenylcyclotrisiloxane in the presence of an acid catalyst, neutralizing the equilibration reaction mixture, and distilling off low boiling volatiles in vacuum.

3. The radiation-curable resin composition of claim 1, wherein the gel fraction is 90–97% by weight.

4. The radiation-curable resin composition of claim 1, wherein the organopolysiloxane (A) has a phenyl content of 15–25 mol-% based on the total amount of $R^2$.

5. The radiation-curable resin composition of claim 1, wherein the organopolysiloxane (A) is diluted with a radiation-curable diluent.

6. The radiation-curable resin composition of claim 1, wherein the photopolymerization initiator is selected from the group consisting of 2,2-diethoxyacetophenone, benzophenone, p-methoxybenzophenone, benzoyl methyl ether, 4-chlorobenzophenone, 4,4-dimethoxybenzophenone, acetophenone, propiophenone, xanthone, naphthoquinone, 4-methylacetophenone, anthraquinone, t-butyl perbenzoate, 2,4,6-trimethylbenzoyldiphenylphosphine oxide, 2-methyl-1-para(methylthio)-phenyl-2-morpholinopropane-1,2-benzyl-2-dimethylamino-1(4-morpholinophenyl)butanone-1, hydroxycyclohexyl phenyl ketone, 3,6-bis(2-morpholinoisobutyl)-9-butylcarbazole, bis(2,6-dimethoxybenzoyl)-2,4,4-trimethylpentylphosphine oxide, thioxanthone, and mixtures thereof.

* * * * *